US009781807B2

(12) United States Patent  
Cao

(10) Patent No.: US 9,781,807 B2  
(45) Date of Patent: Oct. 3, 2017

(54) OVERVOLTAGE PROTECTION CIRCUIT, LED BACKLIGHT DRIVING CIRCUIT AND LCD

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/406,902

(22) Filed: Jan. 16, 2017

(65) Prior Publication Data

US 2017/0127484 A1 May 4, 2017

Related U.S. Application Data

(62) Division of application No. 14/130,319, filed on Dec. 31, 2013, now Pat. No. 9,591,712.

(30) Foreign Application Priority Data

Nov. 7, 2013 (CN) .......................... 2013 1 0554508

(51) Int. Cl.
*H05B 33/08* (2006.01)
*G09G 3/34* (2006.01)
(Continued)

(52) U.S. Cl.
CPC .......... *H05B 33/089* (2013.01); *G09G 3/342* (2013.01); *G09G 3/3406* (2013.01); *H02H 9/043* (2013.01);
(Continued)

(58) Field of Classification Search
CPC .............. H05B 33/089; H05B 33/0815; G09G 3/3406; G09G 3/342; G09G 2330/04; G09G 3/36; H02H 9/043; Y02B 20/341
See application file for complete search history.

(56) References Cited

U.S. PATENT DOCUMENTS 4,949,211 A * 8/1990 Edwards ................ H02H 3/087  
                                                               323/901  
8,030,986 B2 * 10/2011 Sicard ..................... H02P 7/288  
                                                               327/309

(Continued)

*Primary Examiner* — Zeev V Kitov  
(74) *Attorney, Agent, or Firm* — Andrew C. Cheng

(57) ABSTRACT

An OVP circuit includes a voltage boost circuit, for boosting an input voltage into an output voltage in need and providing the output voltage to a load, a voltage control module for controlling the voltage boost circuit to boost an input voltage into an output voltage in need and for providing the output voltage to the load, an overvoltage protection module for monitoring a voltage of a positive terminal of the load to enable or disable the voltage control module, and an overvoltage adjusting module for monitoring an operation voltage of the load to adjust the overvoltage. It effectively prevents from the abnormal operation attributed by over practical operation voltage or prevents components from damage attributed by tardy protection. The present invention also proposes an LED backlight driving circuit using the OVP circuit and an LCD having the LED backlight driving circuit.

5 Claims, 4 Drawing Sheets

(51) Int. Cl.
*H02H 9/04* (2006.01)
*G09G 3/36* (2006.01)

(52) U.S. Cl.
CPC ........... *H05B 33/0815* (2013.01); *G09G 3/36* (2013.01); *G09G 2330/04* (2013.01); *Y02B 20/341* (2013.01)

(56) References Cited

U.S. PATENT DOCUMENTS

| | | | | |
|---|---|---|---|---|
| 8,692,477 B1* | 4/2014 | Lee | .................... | H05B 33/0815 315/185 S |
| 2008/0285271 A1* | 11/2008 | Roberge | .................. | F21S 8/033 362/235 |
| 2010/0289423 A1* | 11/2010 | Yao | .................... | H05B 41/2825 315/246 |
| 2013/0127353 A1* | 5/2013 | Athalye | ............. | H05B 33/0815 315/193 |

\* cited by examiner

OVERVOLTAGE PROTECTION CIRCUIT, LED BACKLIGHT DRIVING CIRCUIT AND LCD

CROSS REFERENCE TO RELATED APPLICATIONS

This is a divisional application of co-pending U.S. patent application Ser. No. 14/130,319, filed on Dec. 31, 2013, which is a national stage patent application of PCT/CN2013/087032, filed on Nov. 13, 2013, claiming foreign priority of Chinese patent application No. 201310554508.1, filed on Nov. 7, 2013, disclosure thereof is incorporated, in the entirety thereof, by reference herein.

BACKGROUND OF THE INVENTION

1. Field of the Invention

The present invention relates to an overvoltage protection circuit, an LED backlight driving circuit comprising the overvoltage protection circuit, and a liquid crystal display (LCD) having the LED backlight driving circuit.

2. Description of the Prior Art

With technical development, a backlight technology of a liquid crystal display has been developing. A conventional liquid crystal display uses cold cathode fluorescence lamp (CCFL) as a backlight source. A backlight source technology for an LED backlight source has been invented to overcome disadvantages of CCFL backlight sources, such as worse color restoration, low luminous efficiency, high discharge voltage, low discharge property in low temperature, long heating time for stable grayscale, etc. In a liquid crystal display, an LED backlight source and a liquid crystal display panel are set up in opposite for the LED backlight source to provide light to the liquid crystal display panel. The LED backlight source includes at least one LED string comprising a plurality of LEDs in serial. In a process of producing or assembling LED backlight sources, voltage applied on the LED string is over or under predetermined value on account of technical difference.

FIG. 1 is a circuit diagram of a driving circuit of an LED backlight source in a conventional LCD. As FIG. 1 shows, the driving circuit of the LED backlight source includes a voltage boost circuit 1, an LED string 21, a reference voltage module 41 and a voltage control module 3. The voltage control module 3 is coupled to a reference voltage VFB supplied by the reference voltage module 41, and the voltage control module 3 controls the voltage boost circuit 1 to boost an input voltage to a needed output voltage and to supply the needed output voltage to the LED string 21. The reference voltage module 41 comprises a resistor R1 and a resistor R2 connected in serial. The resistor R1 coupled between the voltage boost circuit 1 and the resistor R2. The resistor R2 is grounded. The reference voltage VFB is coupled to the resistor R1 and the resistor R2. In the circuit, a constant voltage fed to a positive end of the LED string 21 through the reference voltage module 41 is VFB*R1/R2+VFB. That is the circuit has an overvoltage protection (OVP) function with an OVP voltage value of VFB*R1/R2+VFB. Therefore, if the circuit is malfunction to make the actual voltage applied on the positive end of the LED string 21 exceeding the voltage needed, the circuit disables because the voltage fed to the positive end of the LED string 21 is VFB*R1/R2+VFB. However, the OVP voltage is incapable of adapting practical operation voltage of the LED string 21 in need when the rated voltage of the LED string 21 changes significantly.

For instance, the required operation voltage of the LED string is probably greater than the OVP voltage if the practical operation voltage of the LED string 21 in need is over to a predetermined voltage, which means the LED string needs greater voltage to work normally. It occurs that the LED string does not lighten. On the contrary, the required operation voltage of the LED string is probably less than the OVP voltage if the practical operation voltage of the LED string 21 in need is under to predetermined voltage, which means the LED string needs less voltage to work normally. If abnormal situation happens, it takes a long time to boost a voltage applied on the positive end of the LED to the OVP voltage so that it damages component.

SUMMARY OF THE INVENTION

Owing to defects of the prior art, the present invention proposes an overvoltage protection circuit and an LED backlight driving circuit comprising the overvoltage protection circuit, for automatically adjusting OVP voltages according to a voltage which an LED string needs to prevent components from damage attributed by tardy protection or abnormal operation on account of tremendous voltage change in the LED string.

According to the present invention, an overvoltage protection circuit comprises: a voltage boost circuit, for boosting an input voltage into an output voltage in need and providing the output voltage to a load; a voltage control module, for controlling the voltage boost circuit to boost an input voltage into an output voltage in need and for providing the output voltage to the load and to drive the load in a constant current; an overvoltage protection module, for monitoring a voltage of a positive terminal of the load and generating a control signal based on the voltage of the positive terminal of the load and a predetermined overvoltage, the control signal being used to control the voltage control module to enable or disable; and an overvoltage adjusting module, for monitoring an operation voltage of the load to generate an adjustment signal according to the operation voltage, the adjustment signal being used for adjusting an overvoltage in the overvoltage protection module.

In one aspect of the present invention, the overvoltage protection module generates a first control signal to control the voltage control module to enable if the overvoltage protection module monitors that the voltage of the positive terminal of the load is under the overvoltage of the overvoltage protection module, and the overvoltage protection module generates a second control signal to control the voltage control module to disable if the overvoltage protection module monitors that the voltage of the positive terminal of the load is over the overvoltage of the overvoltage protection module, wherein if the overvoltage adjusting module monitors the operation voltage in the load is under a standard value, the overvoltage adjusting module generates a first adjustment signal, and the overvoltage protection module decreases the overvoltage according to the first adjustment signal, and if the overvoltage adjusting module monitors the operation voltage in the LED string is over the standard value, the overvoltage adjusting module generates a second adjustment signal, and the overvoltage protection module augments overvoltage according to the second adjustment signal.

According to the present invention, a light emitting diode (LED) backlight driving circuit comprises: a voltage boost circuit, for boosting an input voltage into an output voltage in need and providing the output voltage to an LED string;

a voltage control module, for controlling the voltage boost circuit to boost an input voltage into an output voltage in need and providing the output voltage to an LED string and to drive the LED string in a constant current; an overvoltage protection module, for monitoring a voltage of a positive terminal of the LED string and for generating a control signal based on the voltage of the positive terminal of the LED string and a predetermined overvoltage, the control signal being used to control the voltage control module to enable or disable; and an overvoltage adjusting module, for monitoring an operation voltage of the LED string to generate an adjustment signal according to the operation voltage, the adjustment signal being used for adjusting an overvoltage in the overvoltage protection module.

In one aspect of the present invention, the overvoltage protection module generates a first control signal to control the voltage control module to enable if the overvoltage protection module monitors that the voltage of the positive terminal in the LED string is under the overvoltage of the overvoltage protection module, and the overvoltage protection module generates a second control signal to control the voltage control module to disable if the overvoltage protection module monitors that the voltage of the positive terminal in the LED string is over the overvoltage of the overvoltage protection module.

In yet another aspect of the present invention, if the overvoltage adjusting module monitors the operation voltage in the LED string is under a standard value, the overvoltage adjusting module generates a first adjustment signal, and the overvoltage protection module decreases the overvoltage according to the first adjustment signal, and if the overvoltage adjusting module monitors the operation voltage in the LED string is over the standard value, the overvoltage adjusting module generates a second adjustment signal, and the overvoltage protection module augments overvoltage according to the second adjustment signal.

In another aspect of the present invention, the overvoltage protection module comprises an adjustment circuit for adjusting overvoltage according to an adjustment signal from the overvoltage adjusting module, and a protection circuit for monitoring and comparing a voltage of the positive terminal of the LED string with the overvoltage to generate a control signal coupling to the voltage control module.

In another aspect of the present invention, the adjustment circuit comprises a first voltage regulator, a second voltage regulator, a third voltage regulator, a first field-effect transistor, a second field-effect transistor, a third field-effect transistor and a third resistor;

wherein the first voltage regulator, the second voltage regulator and the third voltage regulator are in electrical series, a cathode of the first voltage regulator is coupled to the protection circuit, an anode of the third voltage regulator is grounded;

gates of the first and the second field-effect transistors are respectively coupled to the overvoltage adjusting module, the adjustment signal from the overvoltage adjusting module controls the first field-effect transistor and the second field-effect transistor to turn on or off, a drain of the first field-effect transistor is coupled to a cathode of the first voltage regulator, a drain of the second field-effect transistor is coupled to a gate of the third field-effect transistor and then coupled to a third reference voltage through the third resistor, a drain of the third field-effect transistor is coupled to an anode of the second voltage regulator, sources of the first, the second and the third field-effect transistors are all grounded; and the protection circuit comprises a fourth resistor and a fourth field-effect transistor, one end of the fourth resistor is coupled to a positive end of the LED string, the other end of the fourth resistor is coupled to a gate of the fourth field-effect transistor and then coupled to the cathode of the first voltage regulator, a drain of the fourth field-effect transistor outputs a control signal coupling to the voltage control module, and a source of the fourth field-effect transistor is grounded.

In another aspect of the present invention, the overvoltage adjusting module comprises a divider circuit, for monitoring an operation voltage of the LED string and generating a dividing voltage, and a comparison circuit, for generating an adjustment signal coupling to the overvoltage protection module based on the dividing voltage.

In another aspect of the present invention, the comparison circuit comprises a first comparator and a second comparator, and wherein an out-of-phase input terminal of the first comparator receives a first reference voltage, an in-phase input terminal of the second comparator receives a second reference voltage, an in-phase input terminal of the first comparator and an out-of-phase input terminal of the second comparator respectively receive the dividing voltage from the divider circuit, and output terminals of the first and the second comparators respectively couple adjustment signals to the overvoltage protection module, wherein the first reference voltage is over the second reference voltage.

In still another aspect of the present invention, the divider circuit comprises a first resistor and a second resistor, wherein one end of the first resistor is coupled to the positive terminal of the LED string, the other end of the first resistor is coupled to one end of the second resistor and then coupled to the comparison circuit, and the other end of the second resistor is grounded.

In yet another aspect of the present invention, the divider circuit comprises a first resistor and a second resistor, wherein one end of the first resistor is coupled to the positive terminal of the LED string, the other end of the first resistor is coupled to one end of the second resistor and then coupled to the comparison circuit, and the other end of the second resistor is grounded.

According to the present invention, a liquid crystal display comprising a light emitting diode (LED) backlight source driven by an LED backlight driving circuit is provided. The LED backlight driving circuit comprises: a voltage boost circuit, for boosting an input voltage into an output voltage in need and providing the output voltage to an LED string; a voltage control module, for controlling the voltage boost circuit to boost an input voltage into an output voltage in need and providing the output voltage to an LED string and to drive the LED string in a constant current; an overvoltage protection module, for monitoring a voltage of a positive terminal of the LED string and for generating a control signal based on the voltage of the positive terminal of the LED string and a predetermined overvoltage, the control signal being used to control the voltage control module to enable or disable; and an overvoltage adjusting module, for monitoring an operation voltage of the LED string to generate an adjustment signal according to the operation voltage, the adjustment signal being used for adjusting an overvoltage in the overvoltage protection module.

In one aspect of the present invention, the overvoltage protection module generates a first control signal to control the voltage control module to enable if the overvoltage protection module monitors that the voltage of the positive terminal in the LED string is under the overvoltage of the overvoltage protection module, and the overvoltage protection module generates a second control signal to control the voltage control module to disable if the overvoltage protection module monitors that the voltage of the positive terminal in the LED string is over the overvoltage of the overvoltage protection module.

In yet another aspect of the present invention, if the overvoltage adjusting module monitors the operation voltage in the LED string is under a standard value, the overvoltage adjusting module generates a first adjustment signal, and the overvoltage protection module decreases the overvoltage according to the first adjustment signal, and if the overvoltage adjusting module monitors the operation voltage in the LED string is over the standard value, the overvoltage adjusting module generates a second adjustment signal, and the overvoltage protection module augments overvoltage according to the second adjustment signal.

In another aspect of the present invention, the overvoltage protection module comprises an adjustment circuit for adjusting overvoltage according to an adjustment signal from the overvoltage adjusting module, and a protection circuit for monitoring and comparing a voltage of the positive terminal of the LED string with the overvoltage to generate a control signal coupling to the voltage control module.

In another aspect of the present invention, the adjustment circuit comprises a first voltage regulator, a second voltage regulator, a third voltage regulator, a first field-effect transistor, a second field-effect transistor, a third field-effect transistor and a third resistor;

wherein the first voltage regulator, the second voltage regulator and the third voltage regulator are in electrical series, a cathode of the first voltage regulator is coupled to the protection circuit, an anode of the third voltage regulator is grounded;

gates of the first and the second field-effect transistors are respectively coupled to the overvoltage adjusting module, the adjustment signal from the overvoltage adjusting module controls the first field-effect transistor and the second field-effect transistor to turn on or off, a drain of the first field-effect transistor is coupled to a cathode of the first voltage regulator, a drain of the second field-effect transistor is coupled to a gate of the third field-effect transistor and then coupled to a third reference voltage through the third resistor, a drain of the third field-effect transistor is coupled to an anode of the second voltage regulator, sources of the first, the second and the third field-effect transistors are all grounded; and the protection circuit comprises a fourth resistor and a fourth field-effect transistor, one end of the fourth resistor is coupled to a positive end of the LED string, the other end of the fourth resistor is coupled to a gate of the fourth field-effect transistor and then coupled to the cathode of the first voltage regulator, a drain of the fourth field-effect transistor outputs a control signal coupling to the voltage control module, and a source of the fourth field-effect transistor is grounded.

In another aspect of the present invention, the overvoltage adjusting module comprises a divider circuit, for monitoring an operation voltage of the LED string and generating a dividing voltage, and a comparison circuit, for generating an adjustment signal coupling to the overvoltage protection module based on the dividing voltage.

In another aspect of the present invention, the comparison circuit comprises a first comparator and a second comparator, and wherein an out-of-phase input terminal of the first comparator receives a first reference voltage, an in-phase input terminal of the second comparator receives a second reference voltage, an in-phase input terminal of the first comparator and an out-of-phase input terminal of the second comparator respectively receive the dividing voltage from the divider circuit, and output terminals of the first and the second comparators respectively couple adjustment signals to the overvoltage protection module, wherein the first reference voltage is over the second reference voltage.

In still another aspect of the present invention, the divider circuit comprises a first resistor and a second resistor, wherein one end of the first resistor is coupled to the positive terminal of the LED string, the other end of the first resistor is coupled to one end of the second resistor and then coupled to the comparison circuit, and the other end of the second resistor is grounded.

In yet another aspect of the present invention, the divider circuit comprises a first resistor and a second resistor, wherein one end of the first resistor is coupled to the positive terminal of the LED string, the other end of the first resistor is coupled to one end of the second resistor and then coupled to the comparison circuit, and the other end of the second resistor is grounded.

The benefit of the present invention is that the overvoltage protection circuit is capable of automatically adjusting an overvoltage value according to an operation voltage of a load so that it prevents components from damage attributed by tardy protection on account of tremendous voltage change applied on the load. Specifically, the LED backlight driving circuit comprising the overvoltage protection circuit is capable of monitoring the operation voltage in the LED string and controlling the OVP voltage value based on the operation voltage. The overvoltage protection module decreases the OVP voltage value through the first adjustment signal from the overvoltage adjusting module if the operation voltage in the LED string is under a standard value. The overvoltage protection module increases the OVP voltage value through the second adjustment signal from the overvoltage adjusting module if the operation voltage in the LED string is over the standard value. In this way, it automatically adjusts the OVP voltage value based on the practical operation voltage in the LED string if there is a tremendous voltage change in the LED string. It effectively prevents from the non-lightening error attributed by over practical operation voltage in the LED string with lower OVP voltage, or prevents components from damage attributed by taking a long time to boost a voltage applied on a positive end of the LED to the OVP voltage because of lower practical operation voltage in the LED string with over OVP voltage.

DETAILED DESCRIPTION OF THE PREFERRED EMBODIMENTS

The present invention is described in detail in conjunction with the accompanying drawings and embodiments.

Figure 1:
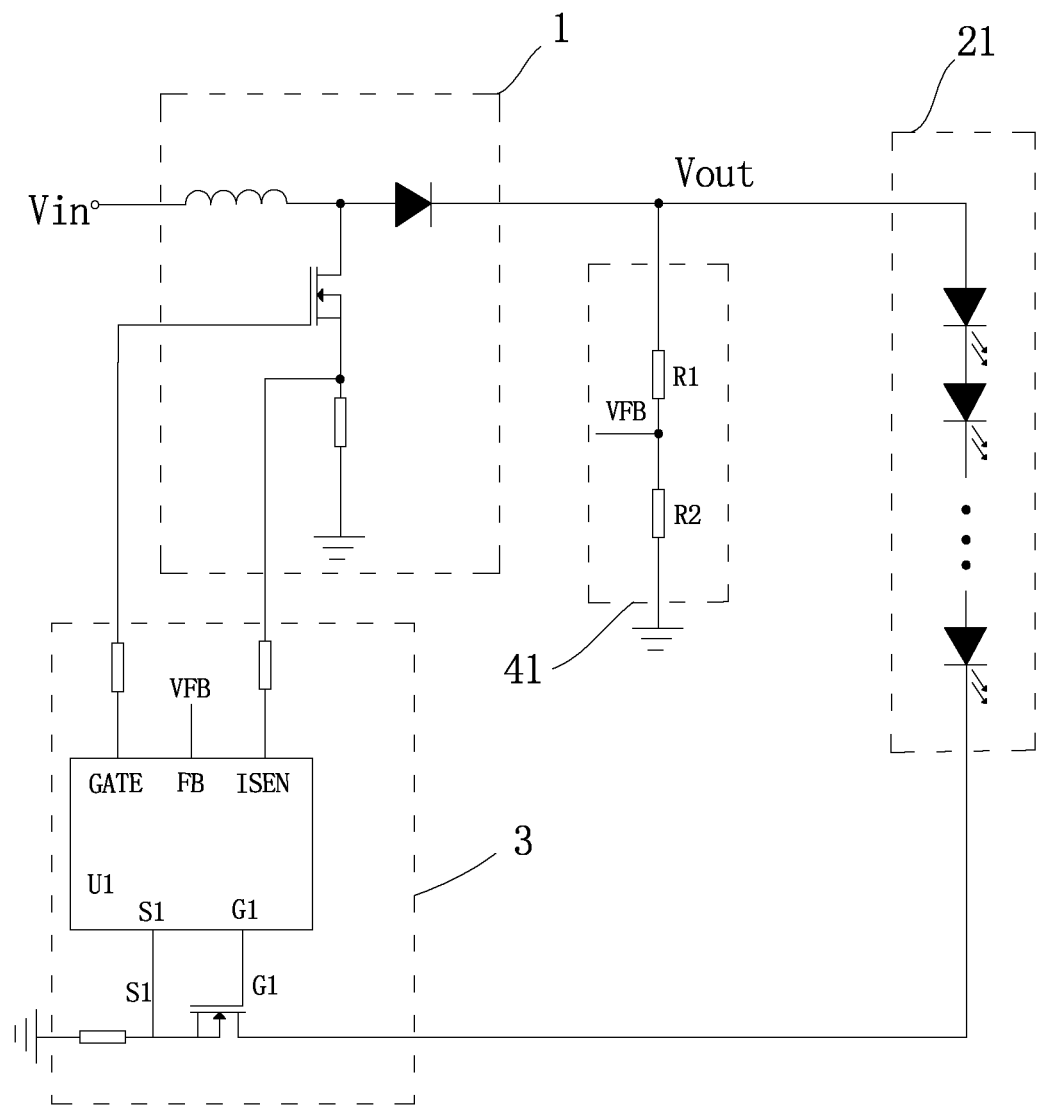
FIG. 1 is a circuit diagram of a driving circuit of an LED backlight source in a conventional LCD.
Figure 2:
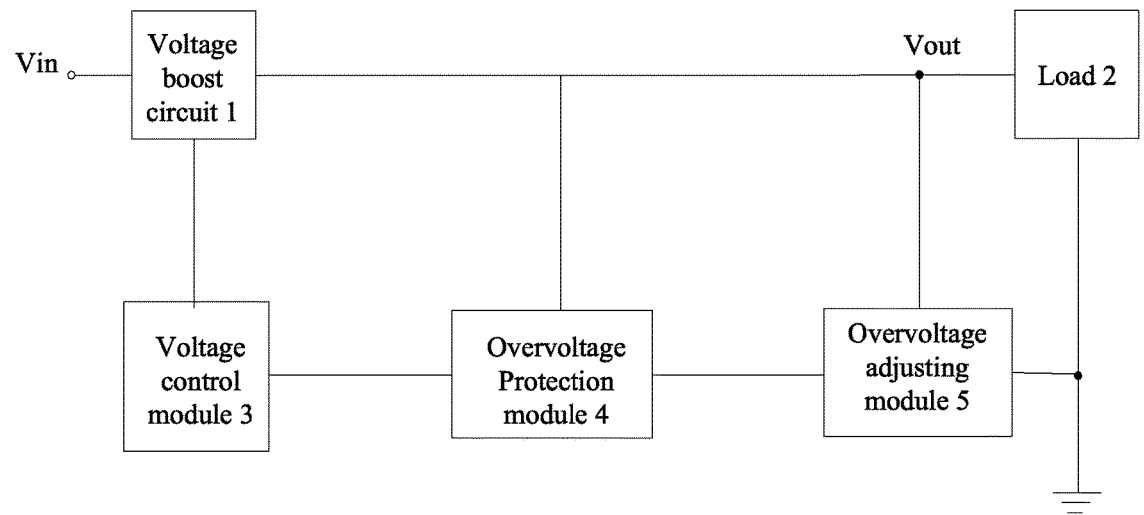
FIG. 2 is a block diagram of an overvoltage protection circuit according to one embodiment of the present invention.

FIG. 2 is a block diagram of an overvoltage protection circuit according to one embodiment of the present invention.

Referring to FIG. 2, the overvoltage protection circuit of the embodiment comprises a voltage boost circuit 1 for boosting an input voltage Vin into an output voltage Vout in need and supplying the output voltage Vout to a load 2, a voltage control module 3 for controlling the voltage boost circuit 1 to boost an input voltage Vin into an output voltage Vout in need and for providing the output voltage Vout to the load 2 to drive the load 2 under a constant current, an overvoltage protection module 4 for monitoring the voltage applied on the positive end of the load 2 and generating a control signal which is used to control the voltage control module 3 to enable or disable based on the voltage applied on the positive end and a predetermined overvoltage, and an overvoltage adjusting module 5 for monitoring the operation voltage of the load 2 and generating an adjustment signal which is used to limit the overvoltage in the overvoltage protection module 4, according to the operation voltage to adjust the overvoltage.

The overvoltage protection module 4 generates a first control signal to control the voltage control module 3 to work if the overvoltage protection module 4 monitors that the voltage of the positive end of the load 2 is under the overvoltage of the overvoltage protection module 4. On the other hand, the overvoltage protection module 4 generates the second control signal to control the voltage control module 3 to stop working if the overvoltage protection module 4 monitors that the voltage of the positive end of the load 2 is over the overvoltage of the overvoltage protection module 4 so that it practices overvoltage protection.

If the overvoltage adjusting module 5 monitors the operation voltage of the load 2 is under the standard value, the overvoltage adjusting module 5 generates the first adjustment signal coupling to the overvoltage protection module 4, and the overvoltage protection module 4 decreases overvoltage according to the first adjustment signal. On the other hand, if the overvoltage adjusting module 5 monitors the operation voltage of the load 2 is over the standard value, the overvoltage adjusting module 5 generates the second adjustment signal coupling to the overvoltage protection module 4, and the overvoltage protection module 4 augments overvoltage according to the second adjustment signal.

The overvoltage protection circuit of the embodiment is capable of automatically adjusting an overvoltage according to an operation voltage of a load so that it prevents components from damage attributed by tardy protection or abnormal operation on account of tremendous voltage change applied on the load.

Figure 3:
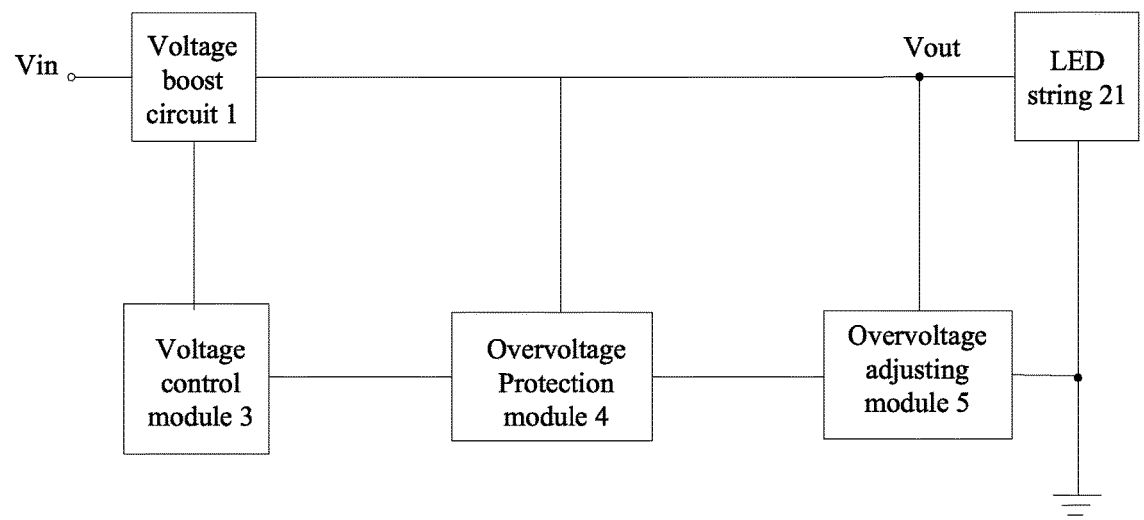
FIG. 3 shows a block diagram of an LED backlight driving circuit according to another embodiment of the present invention.

The overvoltage protection circuit is applied to the LED backlight driving circuit as shown in FIG. 3. The load in the overvoltage protection circuit is the LED string 21.

Figure 4:
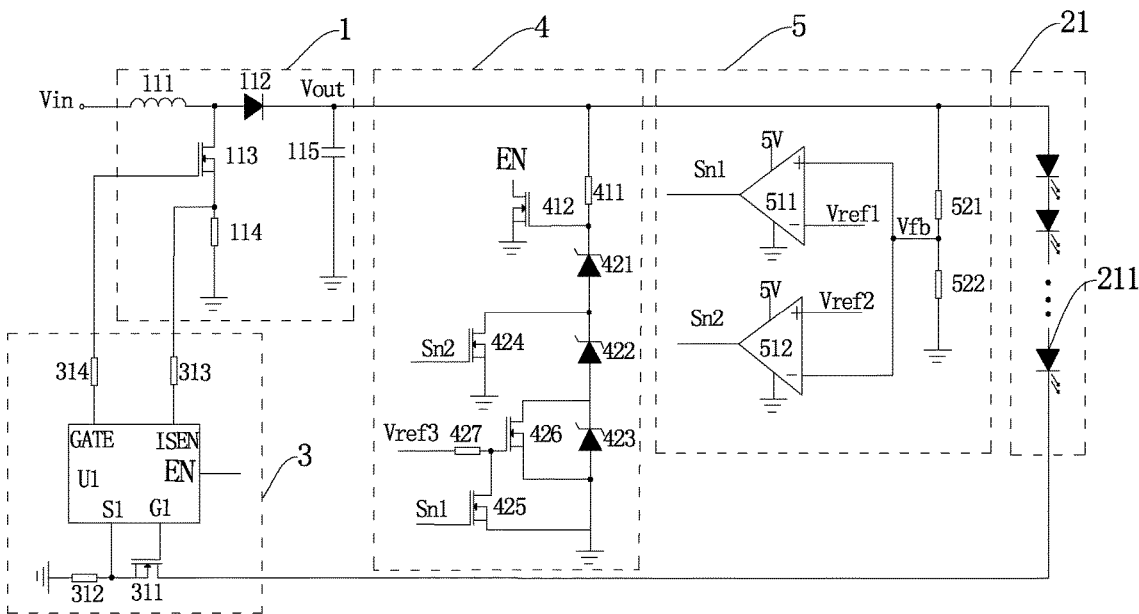
FIG. 4 is a circuit diagram of the LED backlight driving circuit according to an embodiment of the present invention.
Figure 5:
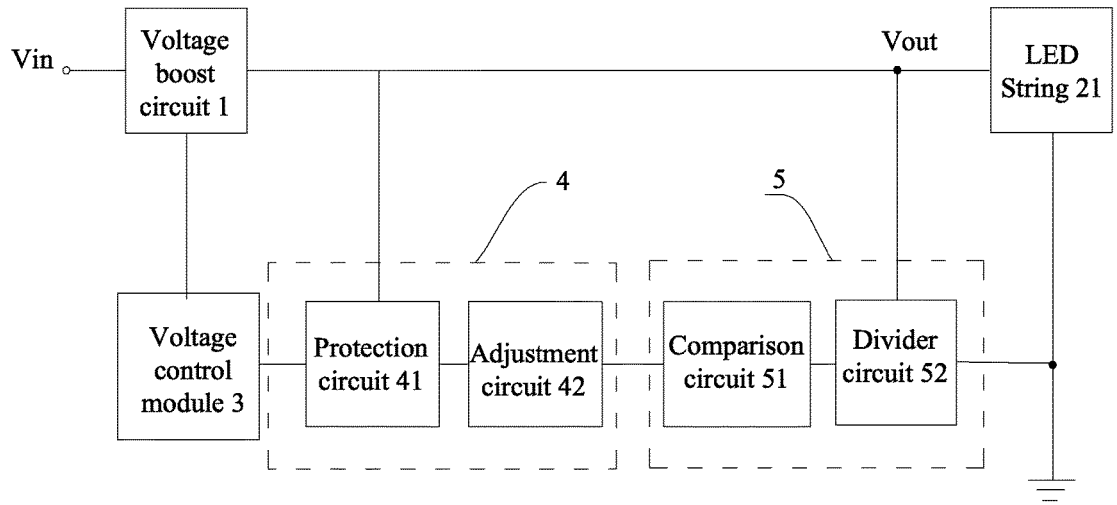
FIG. 5 is a block diagram of the LED backlight driving circuit according to an embodiment of the present invention.

FIG. 4 and FIG. 5 are respectively a circuit diagram and a block diagram of the LED backlight driving circuit according to an embodiment of the present invention.

Refer to FIG. 4 to FIG. 7. The LED backlight driving circuit of the embodiment specifically comprises the voltage boost circuit 1, the LED string 21, the voltage control module 3, the overvoltage protection module 4 and the overvoltage adjusting module 5.

The voltage boost circuit 1 comprises an inductor 111, a rectifying diode 112, a fifth field-effect transistor 113, a fifth resistor 114 and a capacitor 115. One end of the inductor 111 receives the input direct current (DC) voltage Vin, and the other end is coupled to an anode of the rectifying diode 112 and a drain of the fifth field-effect transistor 113. A gate of the fifth field-effect transistor 113 is coupled to the voltage control module 3, and the signal from the voltage control module 3 controls the fifth field-effect transistor 113 to turn on or off. A source of the fifth field-effect transistor 113 is grounded via the fifth resistor 114. A negative end of the rectifying diode 112 is grounded through the capacitor 115 and serves as the output terminal of the voltage boost circuit 1 coupled to the LED string 21.

The voltage control module 3 comprises a control chip U1, a sixth field-effect transistor 311, a sixth resistor 312, a seventh resistor 313 and an eighth resistor 314. A drain of the sixth field-effect transistor 311 is coupled to a negative terminal of the LED string 21, and a source of the sixth field-effect transistor 311 is electrically grounded through the sixth resistor 312. The control chip U1 coupled to the source of the sixth field-effect transistor 311 through a pin S1 is used for monitoring a voltage applied on the sixth resistor 312. The control chip U1 coupled to the gate of the sixth field-effect transistor 311 through a pin G1 is used for controlling the sixth field-effect transistor 311 to turn on or off. A pin ISEN of the control chip U1 coupled to the source of the fifth field-effect transistor 113 in the voltage boost circuit 1 through the seventh resistor 313 is used for detecting current flowing through the source of the fifth field-effect transistor 113. A pin GATE of the control chip U1 coupled to the gate of the fifth field-effect transistor 113 through the eighth resistor 314 generates control signals to control the fifth field-effect transistor 113 to turn on or off. An enable signal pin EN of the control chip U1 is coupled to the overvoltage protection module 4 and receives the control signal EN from the overvoltage protection module 4. The control chip U1 enables or disables according to the control signal coupled to the overvoltage protection module 4. In the meantime, the control chip U1 controls the field-effect transistor 113 to turn on or off to control the voltage boost circuit 1 through the pin GATE by monitoring changes for voltages of the sixth resistor 312 and current of the source of the fifth field-effect transistor 113 when the control chip U1 operates normally. Therefore, the voltage boost circuit 1 boosts the input voltage Vin into the needed output voltage Vout for the LED string 21 to drive the LED string 21 in a constant current.

Figure 6:
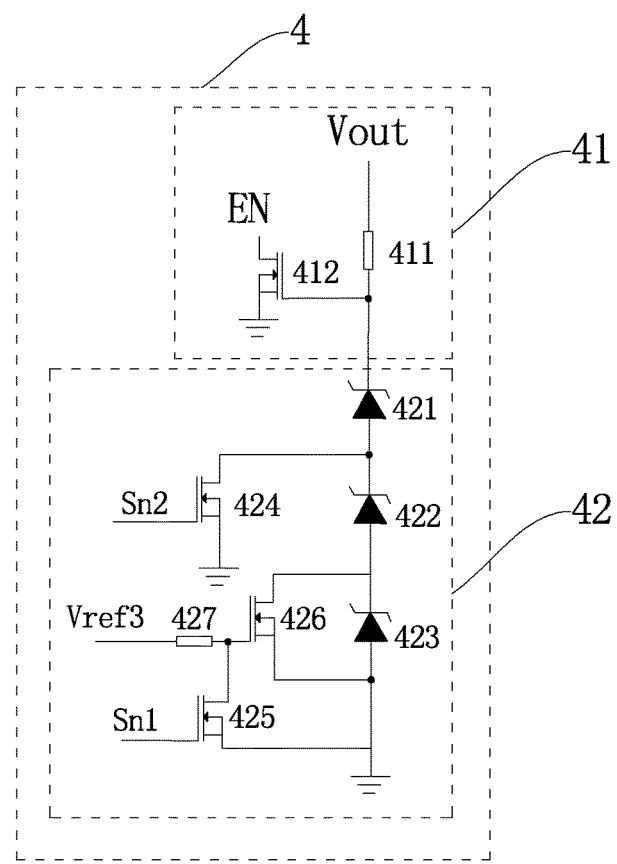
FIG. 6 is a circuit diagram of the overvoltage protection module according to an embodiment of the present invention.

As described above, the overvoltage protection module 4 monitors the voltage of the positive terminal of the LED string 21 and generates a control signal EN, for controlling the voltage control module 3 to enable or disable, according to the voltage of the positive terminal and the predetermined overvoltage. The detailed circuit diagram of the overvoltage protection module 4 is shown in FIG. 6. The overvoltage protection module 4 comprises a protection circuit 41 and an adjustment circuit 42. The protection circuit 41 includes a fourth resistor 41 and a fourth field-effect transistor 412. The adjustment circuit 42 includes a first voltage regulator 421, a second voltage regulator 422, a third voltage regulator 423, a first field-effect transistor 424, a second field-effect transistor 425, a third field-effect transistor 426 and a third resistor 427. The first voltage regulator 421, the second voltage regulator 422 and the third voltage regulator 423 are in electrical series. The cathode of the first voltage regulator 421 is not only coupled to the positive terminal of the LED string 21 (i.e. the output of the voltage boost circuit 1) through the fourth resistor 411 in the protection circuit 41, but also coupled to the gate of the fourth field-effect transistor 412 in the protection circuit 41 for controlling the fourth field-effect transistor 412 to turn on or off, so that the drain of the fourth field-effect transistor 412 outputs the control signal EN, for controlling the voltage control module 3 to enable or disable. The control signal EN is at low level when the source of the fourth field-effect transistor 412 turns on, and on the contrary, the control signal EN is at high level when the source of the fourth field-effect transistor 412 turns off. The gate of the first field-effect transistor 424 and the gate of the second field-effect transistor 425 are respectively coupled to the overvoltage adjusting module 5. The adjustment signal from the overvoltage adjusting module 5 controls the first field-effect transistor 424 and the second field-effect transistor 425 to turn on or off. The drain of the first field-effect transistor 424 is coupled to the first voltage regulator 421. The drain of the second field-effect transistor 425 and the gate of the third field-effect transistor 426 are coupled with each other and then coupled to the third reference voltage via the third resistor 427, and controls the third field-effect transistor 426 to turn on or off. The drain of the third field-effect transistor 426 is coupled to the anode of the second voltage regulator 422. The sources of the first field-effect transistor 424, of the second field-effect transistor 425 and of the third field-effect transistor 426 are electrically connected to the anode of the third voltage regulator 423. In the embodiment, the overvoltage protection module 4 arranges the OVP voltage according to sets of regulating voltages of the first voltage regulator 421, the second voltage regulator 422 and the third voltage regulator 423.

Figure 7:
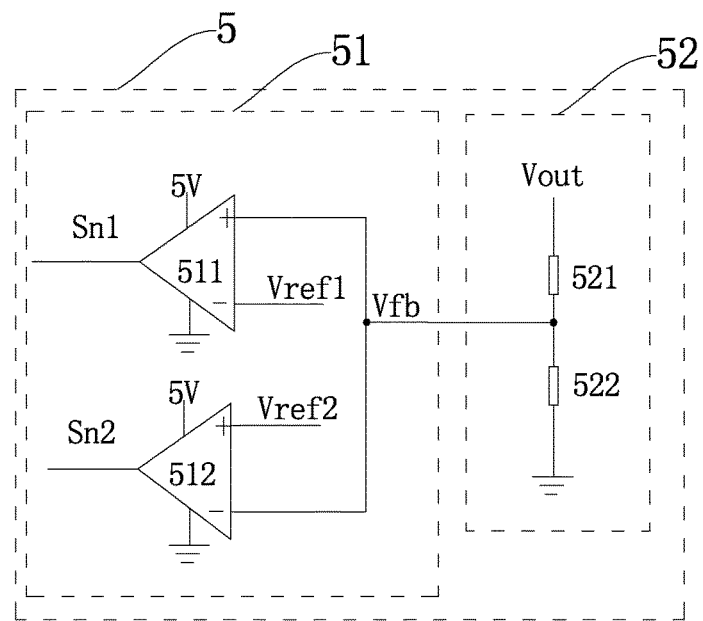
FIG. 7 is a circuit diagram of the overvoltage adjusting module according to an embodiment of the present invention.

As mentioned above, the overvoltage adjusting module 5 monitors the operation voltage of the LED string 21 and generates an adjustment signal, for adjusting the overvoltage of the overvoltage protection module 4, according to the operation voltage. The detailed circuit diagram of the overvoltage adjusting module 5 is illustrated in FIG. 7. The overvoltage adjusting module 5 comprises a comparison circuit 51 and a divider circuit 52. The comparison circuit 51 comprises a first comparator 511 and the second comparator 512. The divider circuit 52 comprises a first resistor 521 and a second resistor 522. The first resistor 521 and the second resistor 522 are connected in series and grounded, and the other end of the first resistor 521 is coupled to the positive end. A dividing voltage Vfb between the first resistor 521 and the second resistor 522 is output and coupled to an in-phase input terminal of the first comparator 511 and an out-of-phase input terminal of the second comparator 512 in the comparison circuit 51. The out-of-phase input terminal of the first comparison 511 receives the first reference voltage Vref1, and the in-phase terminal of the second comparator 512 receives the second reference voltage Vref2. The output terminal of the first comparator 511 is coupled to the gate of the second filed-effect transistor 425 in the overvoltage protection module 4. The adjustment signal Sn1 output from the first comparator 511 determines the second field-effect transistor 425 to turn on or off. The output terminal of the second comparator 512 is coupled to the gate of the first filed-effect transistor 424 in the overvoltage protection module 4. The adjustment signal Sn2 output from the second comparator 512 determines the first field-effect transistor 424 to turn on or off. Vref1>Vref2.

In the embodiment, the LED string 21 comprises at least one LED 211.

The following is a detailed description of the working process for the LED backlight driving circuit in FIG. 4. The regulating voltage of the first voltage regulator 421 is V1, that of the second voltage regulator is V2, that of the third voltage regulator 423 is V3, the initial predetermined OVP voltage is V1+V2+V3, and the OVP voltage changes with practical operation voltage of the LED string 21 after the LED string 21 works steadily.

(a) When the operation voltage of the LED string 21 is at normal range, which means the voltage at the positive terminal of the LED string 21 is normal, the relation among the dividing voltage Vfb of the divider circuit 52, the reference voltages Vref1 and Vref2 is Vref2<Vfb<Vref1. At the time, both the adjustment signal Sn1 from the first comparator 511 and the adjustment signal Sn2 from the second comparator 512 are at low level, and the OVP voltage set by the overvoltage protection module 4 is V1+V2 when the first field-effect transistor 424 and the second field-effect transistor 425 turn off and the third field-effect transistor 426 turns on.

(b) When the operation voltage of the LED string 21 is out of the standard value, which means the voltage at the positive terminal of the LED string 21 is over, the relation among the dividing voltage Vfb of the divider circuit 52, the reference voltages Vref1 and Vref2 is Vfb>Vref1>Vref2. At the time, the adjustment signal Sn1 from the first comparator 511 is at high level, the adjustment signal Sn2 from the second comparator 512 is at low level, and the OVP voltage set by the overvoltage protection module 4 is V1+V2+V3 to raise the OVP voltage correspondently when the first field-effect transistor 424 and the third field-effect transistor 426 turn off and the second field-effect transistor 425 turns on. Since the OVP voltage arises, the situation that the LED string fails to lit due to higher operation voltage of LED string but lower OVP standard value is avoided.

(c) When the operation voltage of the LED string 21 is under the standard value, which means the voltage at the positive terminal of the LED string 21 is lower, the relation among the dividing voltage Vfb of the divider circuit 52, the reference voltages Vref1 and Vref2 is Vfb>Vref1>Vref2. At the time, the adjustment signal Sn1 from the first comparator 511 is at low level, the adjustment signal Sn2 from the second comparator 512 is at high level, and the OVP voltage set by the overvoltage protection module 4 is V1 to lessen the OVP voltage correspondently when the first field-effect transistor 424 and the third field-effect transistor 426 turn on and the second field-effect transistor 425 turns off. It turns out to prevent component from damage attributed by taking a long time to boost a voltage of a positive end of the LED to the OVP voltage because of lower practical operation voltage in the LED string with over OVP voltage.

There is no current through the fourth resistor 412 if the voltage of the positive terminal of the LED string is under the OVP voltage, then the fourth field-effect transistor 412 turns off, the control signal EN is at high level, and the control chip U1 runs normally. On the contrary, there is current through the fourth resistor 412 if the voltage of the positive terminal of the LED string is over the OVP voltage, then the fourth field-effect transistor 412 turns on, the control signal EN is at low level, the control chip U1 stops working normally, and it turns out to achieve overvoltage protection.

In sum, the present invention provides the overvoltage protection circuit capable of automatically adjusting an overvoltage according to an operation voltage of a load so that it prevents components from damage attributed by errors or tardy protection on account of tremendous voltage change of the load. Specifically, the LED backlight driving circuit, comprising the overvoltage protection circuit, is capable of monitoring the operation voltage in the LED string and controlling the OVP voltage value based on the operation voltage. The overvoltage protection module decreases the OVP voltage value through the first adjustment signal from the overvoltage adjusting module if the operation voltage in the LED string is under standard value. The overvoltage protection module increases the OVP voltage value through the second adjustment signal from the overvoltage adjusting module if the operation voltage in the LED string is over standard. In this way, it automatically adjusts the OVP voltage value based on the practical operation voltage in the LED string if there is a tremendous voltage change in the LED string. It effectively prevents from the non-lightening error attributed by over practical operation voltage in the LED string with lower OVP voltage, or prevents components from damage attributed by taking a long time to boost a voltage of a positive end of the LED to the OVP voltage because of lower practical operation voltage in the LED string with over OVP voltage.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An overvoltage protection circuit, comprising:
a voltage boost circuit, for boosting an input voltage into an output voltage in need and providing the output voltage to a load;
a voltage control module, for controlling the voltage boost circuit to boost an input voltage into an output voltage in need and for providing the output voltage to the load and to drive the load in a constant current;
an overvoltage protection module, for monitoring a voltage of a positive terminal of the load and generating a control signal based on the voltage of the positive terminal of the load and a predetermined overvoltage, the control signal being used to control the voltage control module to enable or disable; and
an overvoltage adjusting module, for monitoring an operation voltage of the load to generate an adjustment signal according to the operation voltage, the adjustment signal being used for adjusting an overvoltage in the overvoltage protection module;
wherein the overvoltage protection module generates a first control signal to control the voltage control module to enable if the overvoltage protection module monitors that the voltage of the positive terminal of the load is under the overvoltage of the overvoltage protection module, and the overvoltage protection module generates a second control signal to control the voltage control module to disable if the overvoltage protection module monitors that the voltage of the positive terminal of the load is over the overvoltage of the overvoltage protection module;
wherein if the overvoltage adjusting module monitors the operation voltage in the load is under a standard value, the overvoltage adjusting module generates a first adjustment signal, and the overvoltage protection module decreases the overvoltage according to the first adjustment signal, and if the overvoltage adjusting module monitors the operation voltage in the load is over the standard value, the overvoltage adjusting module generates a second adjustment signal, and the overvoltage protection module augments overvoltage according to the second adjustment signal;
wherein the overvoltage protection module comprises an adjustment circuit for adjusting overvoltage according to an adjustment signal from the overvoltage adjusting module, and a protection circuit for monitoring and comparing a voltage of the positive terminal of the load with the overvoltage to generate a control signal coupling to the voltage control module;
wherein the adjustment circuit comprises a first voltage regulator, a second voltage regulator, a third voltage regulator, a first field-effect transistor, a second field-effect transistor, a third field-effect transistor and a third resistor; and
wherein the first voltage regulator, the second voltage regulator and the third voltage regulator are in electrical series, a cathode of the first voltage regulator is coupled to the protection circuit, an anode of the third voltage regulator is grounded;
gates of the first and the second field-effect transistors are respectively coupled to the overvoltage adjusting module, the adjustment signal from the overvoltage adjusting module controls the first field-effect transistor and the second field-effect transistor to turn on or off, a drain of the first field-effect transistor is coupled to a cathode of the first voltage regulator, a drain of the second field-effect transistor is coupled to a gate of the third field-effect transistor and then coupled to a third reference voltage through the third resistor, a drain of the third field-effect transistor is coupled to an anode of the second voltage regulator, sources of the first, the second and the third field-effect transistors are all grounded; and
the protection circuit comprises a fourth resistor and a fourth field-effect transistor, one end of the fourth resistor is coupled to a positive end of the load, the other end of the fourth resistor is coupled to a gate of the fourth field-effect transistor and then coupled to the cathode of the first voltage regulator, a drain of the fourth field-effect transistor outputs a control signal coupling to the voltage control module, and a source of the fourth field-effect transistor is grounded.

2. The overvoltage protection circuit of claim 1, wherein the overvoltage adjusting module comprises a divider circuit, for monitoring an operation voltage of the load and generating a dividing voltage, and a comparison circuit, for generating an adjustment signal coupling to the overvoltage protection module based on the dividing voltage.

3. The overvoltage protection circuit of claim 2, wherein the comparison circuit comprises a first comparator and a second comparator, and wherein an out-of-phase input terminal of the first comparator receives a first reference voltage, an in-phase input terminal of the second comparator receives a second reference voltage, an in-phase input terminal of the first comparator and an out-of-phase input terminal of the second comparator respectively receive the dividing voltage from the divider circuit, and output terminals of the first and the second comparators respectively couple adjustment signals to the overvoltage protection module, wherein the first reference voltage is over the second reference voltage.

4. The overvoltage protection circuit of claim 2, wherein the divider circuit comprises a first resistor and a second resistor, wherein one end of the first resistor is coupled to the positive terminal of the load, the other end of the first resistor is coupled to one end of the second resistor and then coupled to the comparison circuit, and the other end of the second resistor is grounded.

5. The overvoltage protection circuit of claim 3, wherein the divider circuit comprises a first resistor and a second resistor, wherein one end of the first resistor is coupled to the positive terminal of the load, the other end of the first resistor is coupled to one end of the second resistor and then coupled to the comparison circuit, and the other end of the second resistor is grounded.

* * * * *